United States Patent
Hussain et al.

(10) Patent No.: US 10,041,355 B2
(45) Date of Patent: Aug. 7, 2018

(54) FLUIDFOIL

(71) Applicant: ROLLS-ROYCE PLC, London (GB)

(72) Inventors: Zahid Muhammad Hussain, Derby (GB); Michael Georg Kozuch, Derby (GB)

(73) Assignee: ROLLS-ROYCE plc, London (GB)

(*) Notice: Subject to any disclaimer, the term of this patent is extended or adjusted under 35 U.S.C. 154(b) by 371 days.

(21) Appl. No.: 14/925,402

(22) Filed: Oct. 28, 2015

(65) Prior Publication Data
US 2016/0146015 A1 May 26, 2016

(30) Foreign Application Priority Data
Nov. 24, 2014 (GB) .................... 1420804.5

(51) Int. Cl.
| | | |
|---|---|---|
| *F01D 5/14* | (2006.01) | |
| *F04D 19/00* | (2006.01) | |
| *F04D 27/00* | (2006.01) | |
| *F04D 29/38* | (2006.01) | |
| *F01D 17/16* | (2006.01) | |
| *F04D 27/02* | (2006.01) | |
| *F04D 29/32* | (2006.01) | |
| *F04D 29/56* | (2006.01) | |

(52) U.S. Cl.
CPC .............. *F01D 5/148* (2013.01); *F01D 17/16* (2013.01); *F04D 19/002* (2013.01); *F04D 27/002* (2013.01); *F04D 27/0246* (2013.01); *F04D 29/324* (2013.01); *F04D 29/38* (2013.01); *F04D 29/563* (2013.01); *F04D 29/382* (2013.01); *F05D 2250/90* (2013.01); *F05D 2270/64* (2013.01); *Y02T 50/672* (2013.01); *Y02T 50/673* (2013.01)

(58) Field of Classification Search
CPC ............................... F01D 5/148; F04D 29/382
See application file for complete search history.

(56) References Cited

U.S. PATENT DOCUMENTS

| | | | |
|---|---|---|---|
| 2,568,669 A | 9/1951 | Totheroh | |
| 6,015,115 A * | 1/2000 | Dorsett ................ | B64C 3/46 244/123.11 |
| 7,189,064 B2 * | 3/2007 | Helder ................ | B23K 20/122 416/232 |
| 7,931,443 B1 * | 4/2011 | Potter ................ | F01D 5/26 416/224 |
| 2015/0122951 A1 * | 5/2015 | Wood ................ | B64C 3/44 244/203 |

FOREIGN PATENT DOCUMENTS

| | | |
|---|---|---|
| CN | 103507953 A | 1/2014 |
| JP | S61-196881 A | 9/1986 |
| JP | 2006-248456 A | 9/2006 |
| WO | 2008/003330 A1 | 1/2008 |

OTHER PUBLICATIONS

May 18, 2015 Search Report issued in British Patent Application No. 1420804.5.

* cited by examiner

*Primary Examiner* — David E Sosnowski
*Assistant Examiner* — Juan G Flores
(74) *Attorney, Agent, or Firm* — Oliff PLC

(57) ABSTRACT

A fluidfoil includes a selectively fluid chargeable capillary and a flexible body adjacent the capillary, the shape of the flexible body being adjustable in use via controlling the degree to which the capillary is charged and therefore the forces that the capillary exerts on the flexible body.

20 Claims, 3 Drawing Sheets

FLUIDFOIL

The present disclosure concerns fluidfoils and more specifically variable fluidfoils and variable fluidfoil systems. The invention may have particular application to gas turbine engines and the provision of variable fluidfoils therein, for instance as fan blades, fan outlet guide vanes, engine section stators and/or variable stator vanes. This is not however intended to be limiting and the invention might also find application in other fields (e.g. aircraft propeller blades or wings, wind turbine blades and ship propeller blades).

Fluidfoils (e.g. turbomachinary blades or vanes) are generally designed having a fixed shape (e.g. angle and camber). The shape is selected to be optimised for a specific operating condition (design point). Other design points, which may nonetheless be significant for the operation of the fluidfoil may therefore be compromised.

In some instances the compromise represents a sufficient penalty for it to become viable to design the fluidfoil to be in some way variable. This might typically involve providing a mechanism that rotates the whole or part of the fluidfoil in order to alter its angle of attack or profile. Examples include gas turbine engine variable stator vanes and fan blades, which are selectively rotatable using mechanical drivers and linkages or hydraulics.

A facility for selectively rotating a whole fluidfoil body about an axis does not change the actual shape of the fluidfoil (e.g. its camber). Where the whole fluidfoil body is rotated there may therefore have to be a compromise between a desired leading edge incidence angle and achieving a desired degree of flow turning with the fluidfoil. Where instead only a portion of a fluidfoil is rotated (e.g. a rear portion) a discontinuity of the fluidfoil surface is created, which disadvantageously disrupts the boundary layer flow over the fluidfoil.

Regardless of whether the whole or only part of a fluidfoil is rotated, the variability function introduces a complexity and weight penalty. Furthermore both systems typically suffer from mal-schedule and hysteresis resulting in inaccurate matching to an optimisation instruction. Finally such systems can only produce simple changes in the fluidfoil shape.

According to a first aspect of the invention there is provided a fluidfoil comprising optionally a selectively fluid chargeable capillary and optionally a flexible body optionally adjacent the capillary, the shape of the flexible body optionally being adjustable in use optionally via controlling the degree to which the capillary is charged and therefore the forces that the capillary exerts on the flexible body.

The use of fluid chargeable capillaries within the body of the fluidfoil to change the shape of the body is conceptually quite different to rotating the whole or part of the fluidfoil. The charging of the capillaries may for example give rise to a straightening, curving or alteration in stiffness of all or part of the flexible body and all or part of the fluidfoil. Varying the shape of the fluidfoil need not give rise to contour discontinuities, with the shape potentially remaining smooth and/or continuous regardless of the degree of capillary charge. As will be appreciated, changes to the shape (e.g. camber) of the fluidfoul may be made without necessarily increasing its angle of incidence. Further by providing for varying degrees of fluid charging of the capillaries, a variety of shapes may be achieved and maintained between the shapes extremes achieved with full and no charge. Further, by selecting the arrangement of the capillaries (e.g. distribution and/or direction and/or shape) and/or flexible body (e.g. distribution and/or degree of flexibility), many different options may be provided in terms of the changes in shape that may be obtainable.

In some embodiments the flexible body is elastic. This may mean that the flexible body tends to return to a nominal shape when discharged.

In some embodiments the flexible body comprises a suction side wall of the fluidfoil. In this way the shape of the suction side wall (e.g. its curvature) may be altered via altering the capillary charge.

In some embodiments the flexible body comprises a pressure side wall of the fluidfoil. In this way the shape of pressure side wall (e.g. its curvature) may be altered via altering the capillary charge.

In some embodiments the flexible body comprises a core of the fluidfoil sandwiched between the suction and pressure side walls. The materials of the core and walls may have different stiffness. The core may for example be an elastomer or epoxy having carbon nano-tubes baked therein and the walls may be of a metallic or composite material. The side walls may protect and/or retain the elastomer core, with both the core and side walls being sufficiently flexible to allow the desired degree of shape change based on alteration in capillary charge. In alternative embodiments however the core and side walls may be non-distinct and/or comprise the same material.

In some embodiments the capillary is contained within the core. The capillary may for example be a void passing through the core with or without an additional side wall.

In some embodiments there are a plurality of the capillaries. This may allow shape alteration to occur over a larger area and/or more complicated shape alterations.

In some embodiments some or all of the capillaries are arranged in an array of substantially parallel capillaries. Where capillaries are provided in a parallel array, the capillaries may work in tandem to allow alteration in the curvature of the flexible body in a single direction throughout the region covered by the array.

In some embodiments the capillaries of the array extend in a substantially chordwise direction. This may allow alteration to the chordwise curvature of the fluidfoil.

In some embodiments the pressure side wall has a higher stiffness than the suction side wall. It may be for example that to increase the flexibility of the suction side wall it is provided with one or more regions of increased compliance. The region of increased compliance might for example comprise a crease or hinge about which rotation will preferentially occur. A suitable hinge might for example be created by locally reducing the thickness of the suction side wall. A hinge might for example take the form of a channel provided in the suction side wall, which may for example be tooth shaped. Such a channel may be provided extending in the spanwise direction. In this way the suction side wall may be forced to elongate around the stiffer pressure side wall as capillary charge is increased. This may increase the curvature of the fluidfoil in the chordwise direction as the capillaries are charged. In the field of gas turbine engines a reducing chordwise camber with a decrease in capillary charge may be particularly advantageous. Where for example the fluidfoil is a variable stator vane, and charging of the capillaries is dependent on pressurised fluid generated via engine operation, the stator may naturally and advantageously present its lowest drag configuration at engine start.

As will be appreciated alternative arrangements may be used in order to provide an increase in the curvature of the fluidfoil in the chordwise direction as the capillaries are charged. By way of example, rather than providing a pressure side wall with a higher stiffness than the suction side wall, suitably arranged arrays of capillaries may be used to create a similar effect. If an array of substantially chordwise extending capillaries is provided adjacent the suction side wall, and an array of substantially spanwise extending capillaries is provided adjacent the pressure side wall, the spanwise array may effectively stiffen the pressure side wall when charged. When further the chordwise array is sufficiently charged, the curvature of the fluidfoil in the chordwise direction may increase as it bends about the pressure side wall stiffened by the spanwise array.

In some embodiments the capillaries of the array are provided adjacent the suction side wall.

In some embodiments multiple capillaries are fed by a single artery. It may be for example that a manifold is provided between the artery and the capillaries. It may be that groups or all of the capillaries within the array are fed by a single artery.

In some embodiments the flow of fluid to and/or from at least one of the capillaries is valve controlled. This may increase the control available over the fluidfoil shape. Further the use of valves may allow for independent control over different regions of the fluidfoil, potentially allowing more complicated and/or multi-faceted shape changes. Especially when combined with the possibility of providing arrays of capillaries having different directions (e.g. chordwise, to spanwise or any angle in-between) and/or shapes, valves may provide a high degree of freedom in designing the shape changes that are possible for the fluidfoil in question. Valve control may be specific to a particular fluidfoil where individual fluidfoil control is desired. Alternatively valve control may be ganged where synchronised control over a plurality of fluidfoils is desired.

In some embodiments the fluidfoil is an aerofoil. The aerofoil may for example be a fan blade, a compressor blade, a fan outlet guide vane, an engine section stator, or a variable or fixed stator vane. I some embodiments the blades may be provided on a blisk or bling.

According to a second aspect of the invention there is provided a variable fluidfoil system comprising optionally a pump and optionally a fluidfoil in accordance with the first aspect, where the pump is optionally arranged to selectively deliver fluid to charge the capillary. The pump might for example be one or more turbomachinary compressors of the gas turbine engine or might be a separately provided pump.

The system may further comprise a controller to control the speed of the pump. The controller might for example be a computer system such as an electronic engine controller.

In some embodiments the system further comprises a reservoir for storing fluid to be pumped by the pump. The fluid stored by the reservoir may be a non-reactive fluid and may more specifically be a liquid (preferably in view of its incompressibility). Water may be appropriate in some embodiments where it will not be exposed to temperatures approaching its boiling point. Diluted glycol may be appropriate where a higher boiling point is required. Dilution may be required in order to reduce viscosity.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
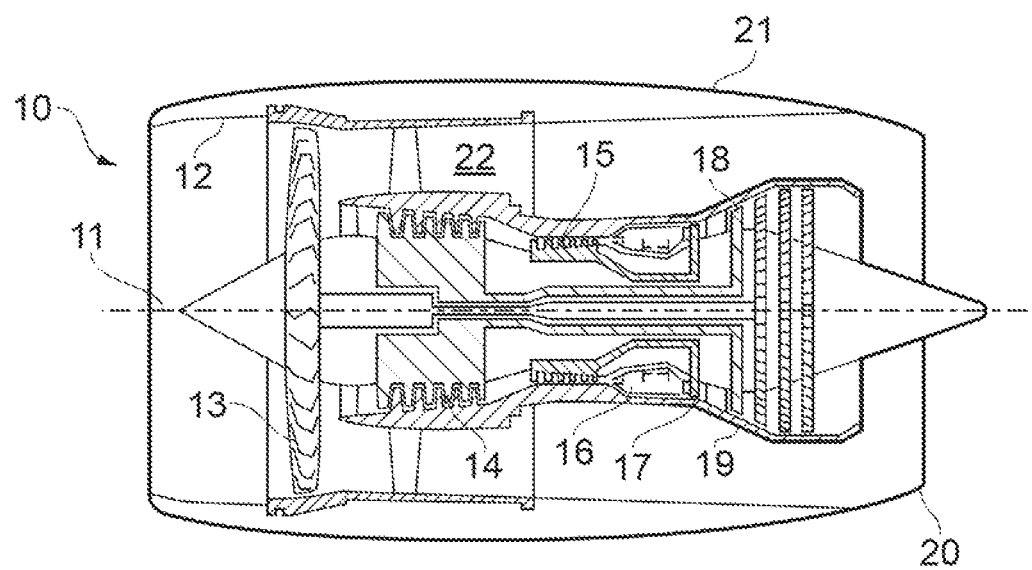
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
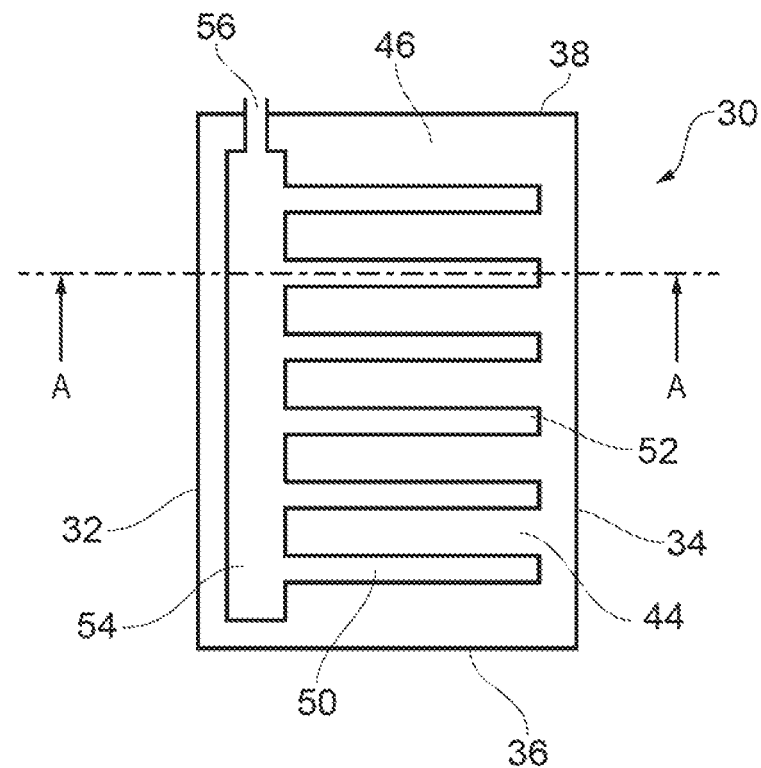
FIG. 2 is a plan view of a fluidfoil in accordance with an embodiment of the invention.
Figure 3A:
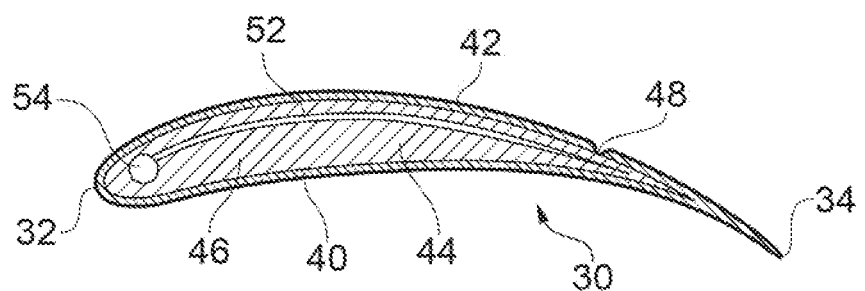
FIG. 3a is a cross-sectional view of the fluidfoil of FIG. 2 taken along the line A-A and shown in a fully discharged condition.
Figure 3B:
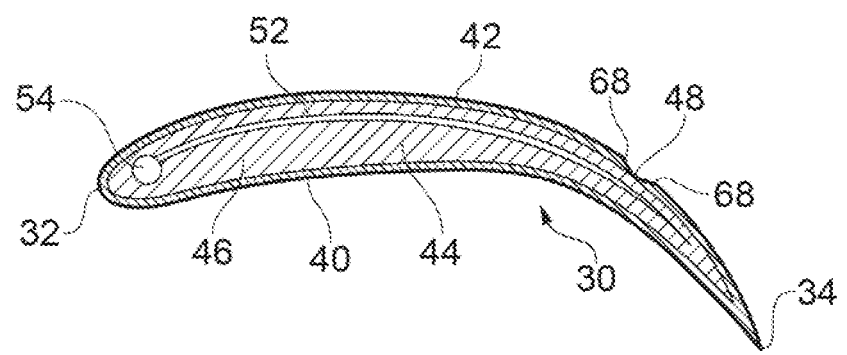
FIG. 3b is a cross-sectional view of the fluidfoil of FIG. 2 taken along the line A-A and shown in a fully charged condition.

Referring now to FIGS. 2, 3a and 3b a fluidfoil (in this case an aerofoil) that might be used as a blade or stator vane in the gas turbine engine 10 is generally shown at 30. The fluidfoil 30 has a leading edge 32, a trailing edge 34, a tip 36, a base 38, a pressure side wall 40 and a suction side wall 42.

Passing through the thickness of the fluidfoil 30, there is provided the pressure side wall 40, a core 44 and the suction side wall 42. The core 44 is therefore sandwiched between the side walls 40, 42. Together the side walls 40, 42 and core form a flexible body 46. The core 44 is fabricated from a flexible and elastic elastomer. Each side wall 40, 42 is fabricated from a metallic layer of a composition and thickness selected to give the wall flexibility. In addition, the suction side wall 40 is provided with a region of increased compliance 48 in the form of tooth shaped, spanwise channel cut into its surface. The channel locally reduces the thickness of the suction side wall 42, reducing its stiffness in that region. The pressure side wall 40 as a whole is consequently stiffer than the suction side wall 42 as a whole.

Within the core 44 is an array 50 of substantially parallel capillaries 52. Each capillary 52 is surrounded by core 44 material, each capillary 52 comprising a conduit or void through the core 44. Each capillary 52 runs substantially adjacent the suction side wall 42, in a chordwise direction, substantially from the leading edge 32 to the trailing edge 34. The array as a whole extends substantially from the base 38 to the tip 36 of the fluidfoil 30.

At their ends nearest the leading edge 32, each capillary 52 has an inlet in fluid communication with a common manifold 54. At its end nearest the base 38 the to manifold has an inlet in fluid communication with an artery 56.

Figure 4:
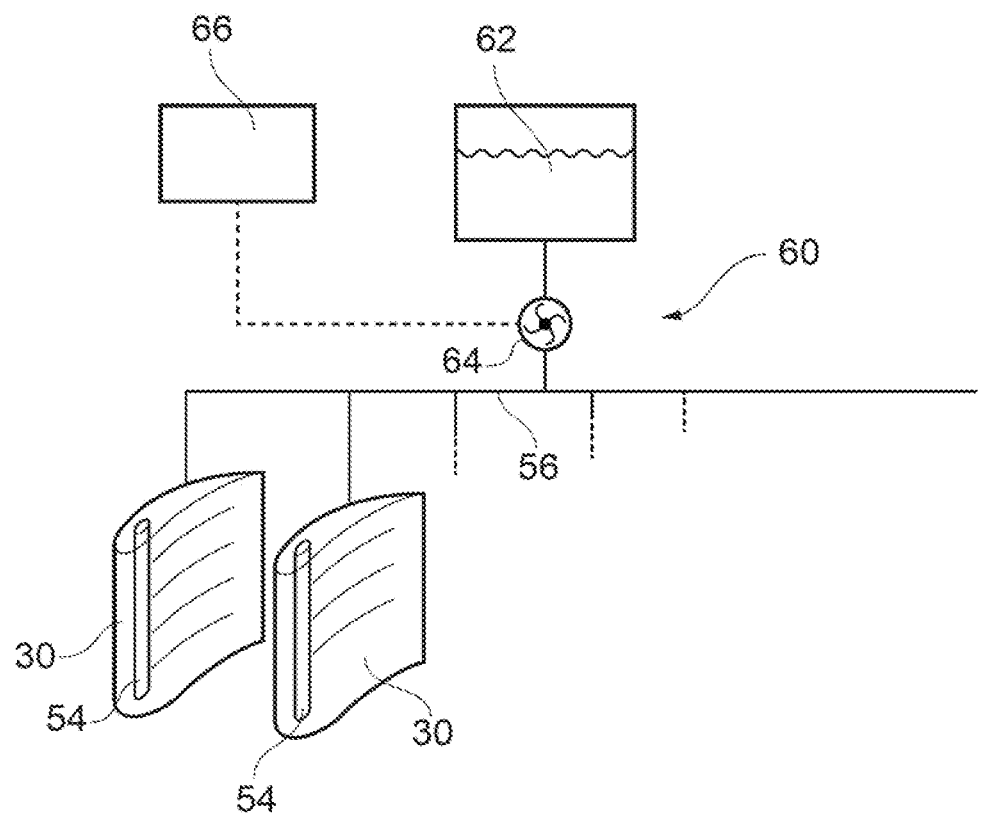
FIG. 4 is a schematic of a variable fluidfoil system in accordance with an embodiment of the invention.

Referring now to FIG. 4 a variable fluidfoil system is generally shown at 60. The variable fluidfoil system includes a plurality of fluidfoils 30 as previously described. The manifold 54 of each fluidfoil 30 is fluidly connected to a fluid reservoir 62 by the artery 56, A pump 64 is provided in the artery 56. The speed of the pump 64 is controlled by an engine electronic controller 66.

In use, and with reference to FIGS. 3a, 3b and 4, the chordwise curvature of each of the fluidfoils 30 is selectively adjustable by altering the fluid charge (e.g. fluid pressure) in each of the capillary arrays 50.

Where it is desired to increase the chordwise curvature of the fluidfoils the pump 64 is controlled by the engine electronic controller 66 to increase the fluid pressure within the capillaries 52 using fluid from the reservoir 62. With respect to each fluidfoil 30, as the fluid pressure increases the forces generated by the charged capillaries 52 are sufficient to overcome the elastic forces of the core 44 and limited stiffness of the side walls 40, 42. Because the suction side wall 42 is not as stiff as the pressure side wall 40, it is forced to elongate around the stiffer pressure side wall 40. As this elongation occurs the curvature of the fluidfoil 30 in the chordwise direction increases. FIG. 3b shows the fluidfoil 30 in a fully charged configuration, with a relatively high fluid pressure in the capillaries 52. Consequently the radius of curvature of the fluidfoil 30 in the chordwise direction is relatively small. As can be seen a particular decrease in the radius of curvature occurs at the region of increased compliance 48. Specifically side walls 68 of the channel move apart as increased bending occurs.

Where it is desired to decrease the chordwise curvature of the fluidfoils, one or more discharge valves (not shown) are opened by the engine electronic controller 66, allowing fluid to return to the reservoir 62 via one or more return conduits (not shown). The pump 64 may also be controlled accordingly (e.g. stopped). The opening of the discharge valves reduces the fluid pressure in the capillaries 52 and thereby the forces they exert on their respective flexible bodies 46. With respect to each fluidfoil 30, restorative forces exerted by the elastic core 44 and side walls 68 reduce the fluidfoil 30 curvature in the chordwise direction. If the reduction of pressure in the capillaries 52 is sufficient, the fluidfoil 30 will return to a nominal shape. FIG. 3a shows the fluidfoil 30 in a fully discharged configuration, with a low fluid pressure in the capillaries 52. Consequently the radius of curvature of the fluidfoil 30 in the chordwise direction is relatively large.

As will be appreciated, suitable control of the pump 64 and/or discharge valves will allow selection and maintenance of multiple different radii of curvature in the chordwise direction between and including the curvatures obtained at fully charged (FIG. 3b) and fully discharged (FIG. 3a). Further a feedback monitoring system (not shown) is also provided to monitor the actual shape of the fluidfoil 30. Where the actual shape of the fluidfoil 30 differs from that instructed, the feedback monitoring system allows the engine electronic controller 66 to make one or more compensating adjustments.

It will be understood that the invention is not limited to the embodiments above-described and various modifications and improvements can be made without departing from the various concepts described herein. By way of example it will be appreciated that the above mentioned embodiment alters the shape of the fluidfoil 30 in only the chordwise direction. In other embodiments however alternative shape changes may be controllable and indeed independent control of multiple different shape components may be possible. By way of example, in some embodiments, any one or more of the following may be changed: fluidfoil curvature in one or more selected directions, fluidfoil twist, fluidfoil sweep and fluidfoil lean. Except where mutually exclusive, any of the features may be employed separately or in combination with any other features and the invention extends to and includes all combinations and sub-combinations of one or more features described herein in any form of fluidfoil.

The invention claimed is:

1. A fluidfoil comprising:
a selectively fluid chargeable capillary; and
a flexible body including a core sandwiched between a suction side wall and a pressure side wall of the fluidfoil, the capillary being contained within the core, wherein the shape of the flexible body is adjustable in use via controlling the degree to which the capillary is charged and therefore the forces that the capillary exerts on the flexible body.

2. The fluidfoil according to claim 1, wherein the flexible body is elastic.

3. The fluidfoil according to claim 1, wherein the fluidfoil includes a plurality of the capillaries.

4. The fluidfoil according to claim 3, wherein some or all of the capillaries are arranged in an array of substantially parallel capillaries.

5. The fluidfoil according claim 1, wherein the flow of fluid to and/or from the capillary is valve controlled.

6. The fluidfoil according to claim 1, wherein the fluidfoil is an aerofoil.

7. A variable fluidfoil system comprising:
a pump; and
the fluidfoil in accordance with claim 1, wherein the pump is arranged to selectively deliver fluid to charge the capillary.

8. The variable fluidfoil system according to claim 7, wherein the system further comprises a reservoir for storing fluid to be pumped by the pump.

9. A fluidfoil comprising:
a plurality of selectively fluid chargeable capillaries, the plurality of capillaries being arranged in an array and extending substantially parallel to one another in a substantially chordwise direction; and
a flexible body adjacent the plurality of capillaries, the shape of the flexible body being adjustable in use via controlling the degree to which the plurality of capillaries are charged and therefore the forces that the plurality of capillaries exert on the flexible body.

10. The fluidfoil according to claim 9, wherein the flexible body comprises a suction side wall of the fluidfoil.

11. The fluidfoil according to claim 10, wherein the flexible body comprises a pressure side wall of the fluidfoil.

12. The fluidfoil according to claim 11, wherein the flexible body comprises a core of the fluidfoil sandwiched between the suction and pressure side walls.

13. The fluidfoil according to claim 12, wherein the plurality of capillaries are contained within the core.

14. The fluidfoil according to claim 9, wherein a pressure side wall has a higher stiffness than a suction side wall.

15. The fluidfoil according to claim 14, wherein the capillaries of the array are provided adjacent the suction side wall.

16. The fluidfoil according claim 9, wherein the flow of fluid to and/or from the plurality of capillaries is valve controlled.

17. A variable fluidfoil system comprising:
a pump; and the fluidfoil in accordance with claim 9, wherein the pump is arranged to selectively deliver fluid to charge the capillaries.

18. The variable fluidfoil system according to claim 17, wherein the system further comprises a reservoir for storing fluid to be pumped by the pump.

19. A fluidfoil comprising:
a selectively fluid chargeable capillary; and
a flexible body adjacent the capillary, the flexible body including a core sandwiched between a suction side wall and a pressure side wall of the fluidfoil, the pressure side wall having a higher stiffness than the suction side wall,
wherein the shape of the flexible body is adjustable in use via controlling the degree to which the capillary is charged and therefore the forces that the capillary exerts on the flexible body.

20. The fluidfoil according to claim 19, wherein the capillary is provided adjacent the suction side wall.

* * * * *